US008621854B2

(12) United States Patent
Mullins et al.

(10) Patent No.: US 8,621,854 B2
(45) Date of Patent: Jan. 7, 2014

(54) SYSTEM AND METHOD FOR DETERMINING AN AGE OF AND CONTROLLING A SELECTIVE CATALYTIC REDUCTION CATALYST

(75) Inventors: Jason Daniel Mullins, Howell, MI (US); Kyle E. Crawford, Howell, MI (US); Rebecca J Darr, Milford, MI (US)

(73) Assignee: GM Global Technology Operations LLC

( * ) Notice: Subject to any disclaimer, the term of this patent is extended or adjusted under 35 U.S.C. 154(b) by 255 days.

(21) Appl. No.: 12/825,689

(22) Filed: Jun. 29, 2010

(65) Prior Publication Data

US 2011/0314793 A1    Dec. 29, 2011

(51) Int. Cl.
F01N 3/00      (2006.01)
F01N 3/02      (2006.01)
F01N 3/10      (2006.01)
F01N 3/20      (2006.01)

(52) U.S. Cl.
USPC .................... 60/301; 60/277; 60/286; 60/295

(58) Field of Classification Search
USPC ..................................... 60/285, 286, 295, 277
See application file for complete search history.

(56) References Cited

U.S. PATENT DOCUMENTS

| 5,551,231 | A  | * | 9/1996 | Tanaka et al. | 60/289 |
| 7,263,825 | B1 | * | 9/2007 | Wills et al. | 60/295 |
| 7,594,392 | B2 | * | 9/2009 | Wang et al. | 60/285 |
| 7,654,076 | B2 | * | 2/2010 | Wills | 60/274 |
| 8,156,729 | B2 | * | 4/2012 | Sun | 60/277 |
| 2007/0044456 | A1 | * | 3/2007 | Upadhyay et al. | 60/295 |
| 2008/0022658 | A1 | * | 1/2008 | Viola et al. | 60/286 |
| 2009/0158706 | A1 | * | 6/2009 | Sun | 60/274 |
| 2009/0266058 | A1 | * | 10/2009 | Kesse et al. | 60/295 |
| 2009/0272105 | A1 | * | 11/2009 | Chi et al. | 60/295 |
| 2010/0281855 | A1 | * | 11/2010 | Sun et al. | 60/286 |

* cited by examiner

*Primary Examiner* — Kenneth Bomberg
*Assistant Examiner* — Dapinder Singh (57) ABSTRACT

An exhaust treatment system for exhaust gas produced by an engine includes a condition control module, a load determination module, and an age determination module. The condition control module decreases a load on a selective catalytic reduction (SCR) catalyst below a predetermined load threshold and increases exhaust gas temperature (EGT) to a predetermined temperature. The load determination module increases injection of a dosing agent into the exhaust gas and determines a load on the SCR catalyst when dosing agent is detected downstream from the SCR catalyst. The age determination module determines an age of the SCR catalyst based the determined load and predetermined loads for first and second SCR catalysts, respectively.

20 Claims, 5 Drawing Sheets

SYSTEM AND METHOD FOR DETERMINING AN AGE OF AND CONTROLLING A SELECTIVE CATALYTIC REDUCTION CATALYST

FIELD

The present disclosure relates to exhaust treatment systems, and more particularly to a system and method for determining an age of and controlling a selective catalytic reduction (SCR) catalyst.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combine air and fuel to create an air/fuel (A/F) mixture that is combusted within a plurality of cylinders. The combustion of the A/F mixture drives pistons which rotatably turn a crankshaft generating drive torque. Specifically, air may be drawn into the cylinders and compressed using the pistons. Fuel may then be combined with (i.e., injected into) the compressed air causing the pressurized A/F mixture to combust (e.g., a compression ignition, or CI engine). For example, CI engines include diesel engines.

Exhaust gas produced during combustion may be expelled from the cylinders into an exhaust manifold. The exhaust gas may include carbon monoxide (CO) and hydrocarbons (HC). The exhaust gas may also include nitrogen oxides (NOx) due to the higher combustion temperatures of CI engines compared to spark ignition (SI) engines. An exhaust treatment system may treat the exhaust gas to remove CO, HC, and/or NOx. For example, the exhaust treatment system may include, but is not limited to, at least one of an oxidation catalyst (OC), a particulate matter (PM) filter, a selective catalytic reduction (SCR) system, NOx absorbers/adsorbers, and catalytic converters.

In the SCR process, a dosing agent is injected into the exhaust gas by a dosing system. For example, the dosing agent may be pure anhydrous ammonia, aqueous ammonia, or urea. The dosing agent includes a reductant (e.g., ammonia, or $NH_3$) that reacts with the NOx in the exhaust gas. Specifically, the reductant mixes with the NOx in the exhaust gas and the mixture may be absorbed onto the SCR catalyst. The SCR catalyst may then break down the absorbed mixture forming water vapor ($H_2O$) and nitrogen gas ($N_2$). The SCR process, therefore, may significantly reduce NOx emissions.

SUMMARY

An exhaust treatment system for exhaust gas produced by an engine includes a condition control module, a load determination module, and an age determination module. The condition control module decreases a load on a selective catalytic reduction (SCR) catalyst below a predetermined load threshold and increases exhaust gas temperature (EGT) to a predetermined temperature. The load determination module increases injection of a dosing agent into the exhaust gas and determines a load on the SCR catalyst when dosing agent is detected downstream from the SCR catalyst. The age determination module determines an age of the SCR catalyst based the determined load and predetermined loads for first and second SCR catalysts, respectively.

A method includes decreasing a load on a selective catalytic reduction (SCR) catalyst below a predetermined load threshold, increasing exhaust gas temperature (EGT) to a predetermined temperature, increasing injection of a dosing agent into exhaust gas produced by an engine, determining a load on the SCR catalyst when dosing agent is detected downstream from the SCR catalyst, and determining an age of the SCR catalyst based the determined load and predetermined loads for first and second SCR catalysts, respectively.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit that provides the described functionality.

Compression ignition (CI) engine systems (e.g., diesel engine systems) may include exhaust treatment systems that remove nitrogen oxides (NOx) from exhaust gas. Specifically, the exhaust treatment systems for CI engines may include an oxidation catalyst (OC) located before (i.e., upstream from) a selective catalytic reduction (SCR) catalyst. The SCR catalyst, on the other hand, may be located upstream from a particulate matter (PM) filter. The OC oxidizes carbon monoxide (CO) and hydrocarbons (HC) to form carbon dioxide ($CO_2$) and water ($H_2O$). The PM filter removes PM from the exhaust gas.

The PM filter may remove PM from the exhaust gas until the PM filter is saturated. In other words, the saturation condition may correspond to when the PM filter is full of PM (e.g., soot), after which a regeneration cycle may begin. The regeneration cycle may introduce HC into the exhaust gas (e.g., via post-combustion fuel injection or auxiliary HC injection). The HC in the exhaust gas may be catalyzed by the OC in an exothermic reaction that generates heat and increases exhaust gas temperature (EGT). The increased EGT at the outlet of the OC (i.e., at the inlet of the PM) may burn and/or breakdown the PM trapped in the PM filter, thus "regenerating" the PM filter.

The SCR catalyst, on the other hand, removes NOx from the exhaust gas. More specifically, the SCR catalyst, in conjunction with a dosing agent (e.g., urea), breaks down the NOx in the exhaust gas into nitrogen gas ($N_2$) and water ($H_2O$). Conventional control systems, therefore, control the SCR process by controlling injection of the dosing agent. The SCR catalyst, however, may decrease in efficiency over time. In other words, the SCR catalyst may "age." Therefore, different amounts of dosing agent may be required based on the age of the SCR catalyst to prevent decreased efficiency of the SCR catalyst.

Accordingly, a system and method are presented that determine an age of an SCR catalyst and control the SCR catalyst based on the determined age. More specifically, the system and method may determine a load on the SCR catalyst during a period when a load on the SCR catalyst is relatively low (e.g., below a predetermined load threshold). For example, the period may include passive regeneration of a PM filter or active EGT control via fuel injectors (e.g., post-combustion fuel injection) and/or an auxiliary HC injector (e.g., auxiliary HC injection).

Figure 1:
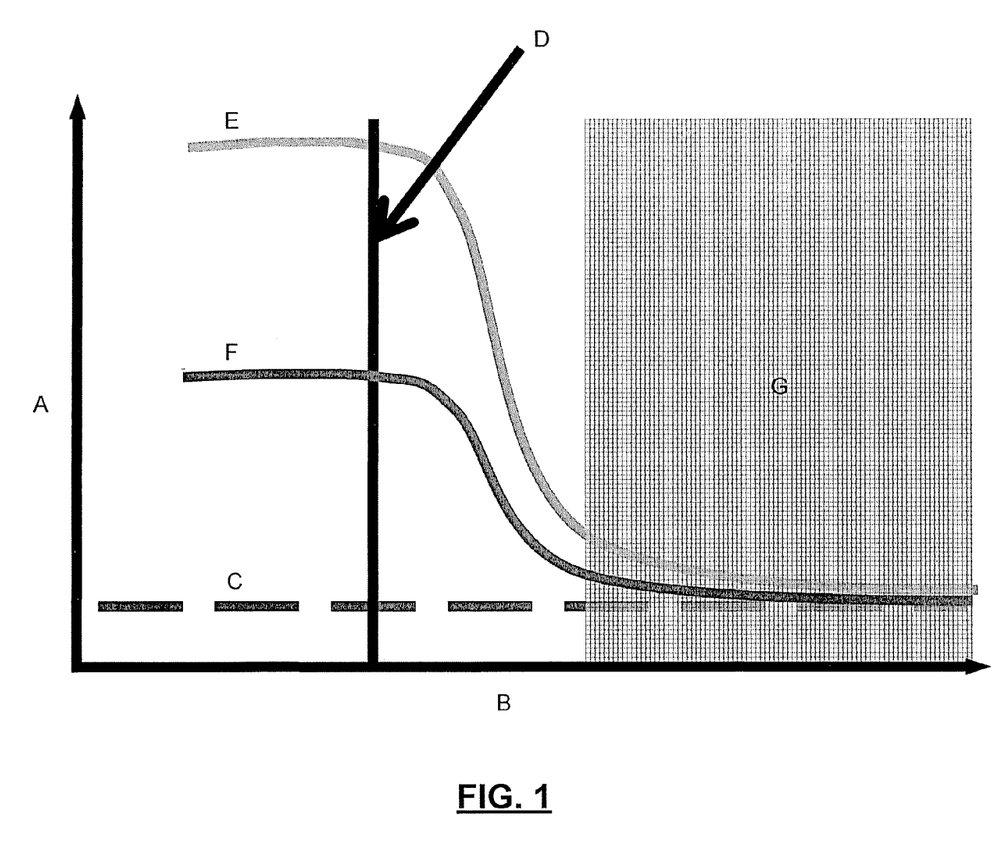
FIG. 1 is a graph illustrating relationships between load and exhaust gas temperature (EGT) for various exemplary selective catalytic reduction (SCR) catalysts.

FIG. 1 illustrates relationships between dosing agent load on an SCR catalyst and EGT. A vertical axis (A) indicates SCR catalyst load and a horizontal axis (B) indicates exhaust gas temperature (e.g., in degrees Celsius, or ° C.). For example, a dashed horizontal line (C) may represent an SCR catalyst load of zero and a solid vertical line (D) may represent a peak load temperature. Curves E and F represent EGT versus load relationships a new SCR catalyst and an aged SCR catalyst, respectively. As shown, the dosing agent load storage capacity on both the new and aged SCR catalysts decreases as EGT increases. Additionally, an EGT range (G) may represent regeneration of a PM filter. In any EGT range where there is a difference between the dosing agent load storage capacity on new and aged SCR catalysts, the difference in load storage capacity may be used to determine the age of the SCR catalyst.

In other words, during the period when EGT is in the desired range (e.g., a temperature range at which the load storage capacity of new and aged SCR catalysts differ), the system and method may increase dosing injection until dosing agent (e.g., $NH_3$) is detected by a downstream NOx sensor ("slip"). The system and method may then determine the load on the SCR catalyst based on a difference between the amount of dosing agent injected when the slip was detected and the amount of dosing agent (e.g., $NH_3$) detected by the downstream NOx sensor. For example, dosing agent (e.g., $NH_3$) may be detected as NOx by the downstream NOx sensor due to cross-sensitivity of NOx sensors. The system and method may then determine the age of the SCR catalyst based on the determined load and predetermined loads for first and second SCR catalysts. For example, the first and second SCR catalysts may include new (e.g., 100% life) and aged (e.g., 50% life) SCR catalysts, respectively.

The system and method may then control injection of the dosing agent based on the determined age of the SCR catalyst. More specifically, the system and method may increase an amount of dosing agent injected based on the determined age of the SCR catalyst. For example, the determined age of the SCR catalyst may include an aging factor for adjusting injection of the dosing agent. Thus, for example only, the system and method may inject a corrected amount of dosing agent that includes a product of a desired amount of dosing agent and an aging factor. Moreover, the system and method may determine whether the SCR catalyst has failed based on the age (or aging factor).

Figure 2:
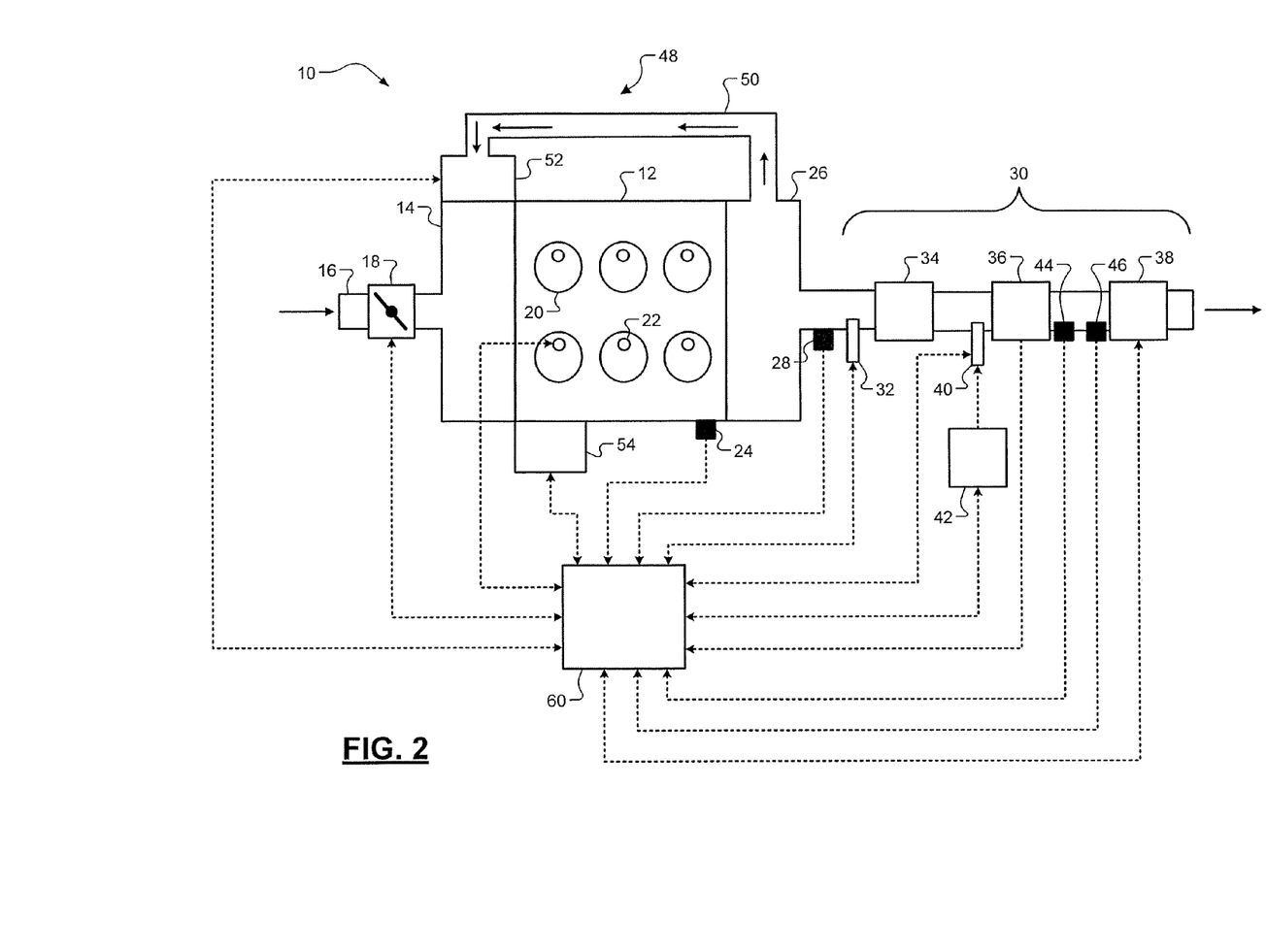
FIG. 2 is a functional block diagram of an exemplary engine system according to the present disclosure.

Referring now to FIG. 2, an engine system 10 includes an engine 12. For example, the engine 12 may be a CI engine (e.g., a diesel engine). The engine 12, however, may also be a different type of engine (e.g., a homogeneous charge compression ignition, or HCCI engine). The engine 12 draws air into an intake manifold 14 through an inlet system 16 that may be regulated by a throttle 18. For example, the throttle 18 may be electronically controlled (i.e., electronic throttle control, or ETC). Additionally, for example, the engine 12 may be unthrottled.

Air from the intake manifold 14 is distributed into a plurality of cylinders 20. While six cylinders are shown, it can be appreciated that the engine 12 may include other numbers of cylinders. Fuel injectors 22 may inject fuel directly into the cylinders 20 (i.e., direct fuel injection). Alternatively, however, the fuel injectors 22 may inject fuel via intake ports of the cylinders 20 (i.e., port fuel injection). The fuel injectors 22 may also inject fuel into the cylinders 20 after combustion of the NF mixture (i.e., post-combustion injection) to introduce hydrocarbons (HC) into exhaust gas.

Pistons (not shown) compress and combust the A/F mixture within the cylinders 20. The pistons drive an engine crankshaft (not shown) during a power stroke to produce drive torque. In one embodiment, the cylinders 20 may include spark plugs (not shown) (e.g., for spark assist in an HCCI engine). An engine speed sensor 24 measures a rotational speed of the engine crankshaft (not shown). For example, the engine speed sensor 24 may measure the rotational speed in revolutions per minute, or RPM.

Exhaust gas resulting from combustion is expelled into an exhaust manifold 26. The exhaust gas may then be treated by an exhaust treatment system and/or recirculated to the intake manifold 14 via an exhaust gas recirculation (EGR) system 48. An exhaust mass air flow (EMAF) sensor 28 may measure a flow rate of exhaust gas into the exhaust treatment system 30. The exhaust treatment system 30 may include an auxiliary injector 32, an OC 34, an SCR catalyst 36, and a PM filter 38. The auxiliary injector 32 may selectively inject HC (e.g., fuel) into the exhaust gas. For example, the auxiliary injector 32 may inject HC into the exhaust gas to increase the exhaust gas temperature (EGT) for regeneration of the PM filter 38. As previously described, however, the fuel injectors 22 may perform post-combustion injection to introduce HC into the exhaust gas.

The OC 34 oxidizes CO and HC to form $CO_2$ and $H_2O$. The SCR catalyst 36 (in conjunction with a dosing agent, such as urea) removes NOx from the exhaust gas. The PM filter 38 removes PM from the exhaust gas before the exhaust gas is released into the atmosphere. The exhaust treatment system 30 may further include a dosing injector 40, a dosing agent (DA) tank 42, a NOx sensor 44, and a temperature sensor 46. While one NOx sensor 44 and one temperature sensor 46 are shown, the exhaust treatment system may include other numbers of NOx and/or temperature sensors. For example, additional NOx and/or temperature sensors may be implemented upstream of (i.e., before) the SCR catalyst 36.

A control module 60 communicates with and/or controls various components of the engine system 10. Specifically, the control module 60 may receive signals from the engine speed sensor 24, the EMAF sensor 28, the NOx sensor 44, and the temperature sensor 46. The control module 60 may communicate with the PM filter 38 to determine when a regeneration cycle is required. Alternatively, the control module 60 may determine that regeneration of the PM filter 38 is required based on other parameters and/or modeling. For example, the control module 60 may determine that regeneration of the PM filter 38 is required when exhaust flow (e.g., measured by the EMAF sensor 28) is less than a predetermined exhaust flow threshold (i.e., the PM filter 38 is restricted).

The control module 60 may also control the throttle 18 (if the engine 12 is throttled), the fuel injectors 22, spark plugs (not shown) (if implemented, such as in an HCCI engine), the auxiliary injector 32, and an exhaust gas recirculation (EGR) valve 52 (discussed in more detail below). More specifically, the control module 60 may actuate the fuel injectors 22 (e.g., post-combustion injection) and/or the auxiliary injector 32 to control EGT and thus may control regeneration of the PM filter 38. The control module 60 may also implement the system and/or method of the present disclosure.

The engine system 10 may further include an EGR system 48. The EGR system 48 includes the EGR valve 52 and an EGR line 50. The EGR system 48 may introduce a portion of exhaust gas from the exhaust manifold 26 into the intake manifold 14. The EGR valve 52 may be mounted on the intake manifold 14. The EGR line 50 may extend from the exhaust manifold 26 to the EGR valve 52, providing communication between the exhaust manifold 26 and the EGR valve 52. As previously described, the control module 60 may actuate the EGR valve 52 to control an amount of exhaust gas introduced into the intake manifold 14.

The engine 12 may also include a turbocharger 54. The turbocharger 54 may be driven by the exhaust gas received through a turbine inlet. For example only, the turbocharger 54 may include a variable nozzle turbine (VNT). The turbocharger 54 increases airflow into the intake manifold 14 to cause an increase in intake MAP (i.e., manifold absolute pressure, or boost pressure). The control module 60 may actuate the turbocharger 54 to selectively restrict the flow of the exhaust gas, thereby controlling the boost pressure.

Figure 3:
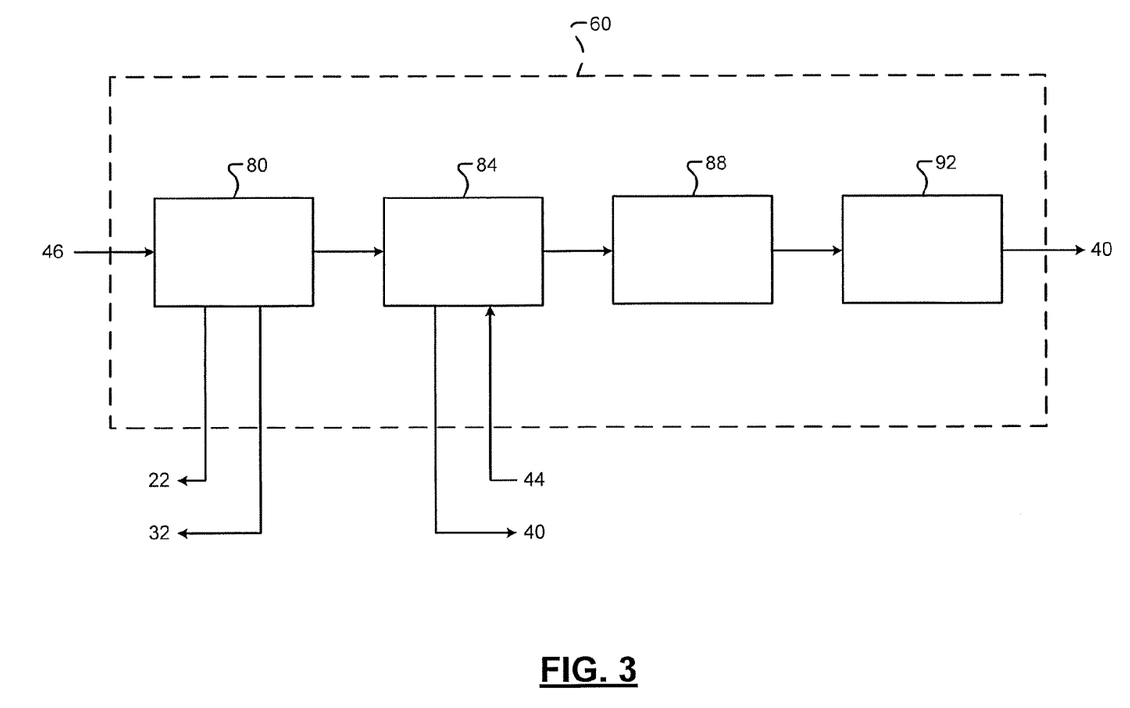
FIG. 3 is a functional block diagram of an exemplary control module according to the present disclosure.

Referring now to FIG. 3, the control module 60 is shown in more detail. The control module 60 may include a condition control module 80, a load determination module 84, an age determination module 88, and an SCR control module 92. The control module 60 may also include memory (not shown) for storing measured and/or determined parameters. For example, the memory (not shown) may include non-volatile memory (NVM).

The condition control module 80 may control the exhaust treatment system 30 to decrease the load on the SCR catalyst 36 below a predetermined load threshold. Specifically, the condition control module 80 may either passively or actively increase EGT to decrease the load on the SCR catalyst 36. For example, the low load may improve speed and/or accuracy of the load determination method of the present disclosure.

The condition control module 80 may passively control EGT by waiting for a regeneration cycle of the PM filter 38. The EGT during a typical regeneration cycle of the PM filter 38 may decrease the load on the SCR catalyst 36 below the predetermined load threshold. For example, a predetermined EGT may correspond to a load that is less than the predetermined load threshold. In other words, the condition control module 80 may monitor the EGT (e.g., via temperature sensor 46) to determine when EGT is sufficiently high (and thus the load is sufficiently low). The condition control module 80 may also introduce a new temperature set point at the end of the regeneration cycle (e.g., greater than a highest EGT during the regeneration cycle).

Alternatively, the condition control module 80 may actively control EGT. For example, the active control of the EGT may be similar to a regeneration cycle of the PM filter 38. In other words, the condition control module 80 may actuate the fuel injectors 22 and/or the auxiliary injector 32 to inject HC into the exhaust gas and increase the EGT. For example, the condition control module 80 may monitor EGT feedback (e.g., via temperature sensor 46 to determine when the stop injection of HC (e.g., fuel) into the exhaust gas. Moreover, the condition control module 80 may increase EGT to the new temperature set point (e.g., a predetermined temperature).

Figure 4A:
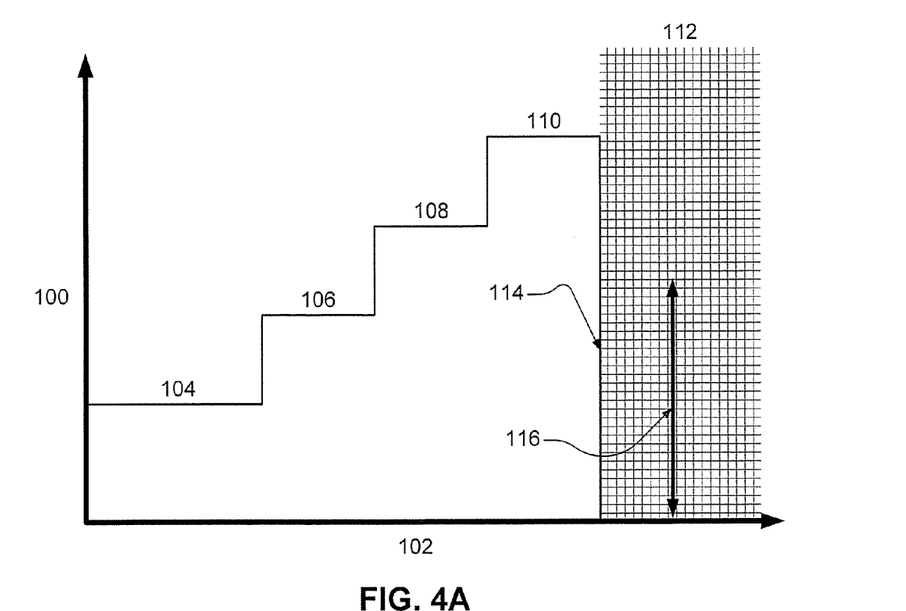
FIG. 4A is a graph illustrating EGT during an exemplary regeneration cycle of a particulate matter (PM) filter and a new temperature set point.

FIG. 4A illustrates EGT control during an exemplary determination of the load on the SCR catalyst. A vertical axis 100 indicates EGT (e.g., in ° C.) and a horizontal axis 102 indicates time. For example, temperature set points 104-110 may be associated with a conventional regeneration cycle of the PM filter 38. Thus, regeneration of the PM filter 38 may be completed at 114. An evaluation window 112 may include a new temperature set point having known SCR loads for both new and aged (e.g., 50% life) SCR catalysts. The new temperature set point may be within a temperature band 116. Additionally or alternatively, the new temperature set point may be actively commanded via auxiliary HC injection and/or post-combustion fuel injection (as previously described).

Referring again to FIG. 3, the condition control module 80 may then generate a status signal to notify the load determination module 84 that the load on of the SCR catalyst 36 is less than the predetermined load threshold. For example, the condition control module 80 may generate the status signal when the EGT (e.g., measured by temperature sensor 46) is greater than or equal to a predetermined temperature threshold. The load determination module 84 may wait for the load on the SCR catalyst 36 to decrease below the predetermined load threshold before determining the load on the SCR catalyst 36. For example, the status signal may be generated when EGT increases above a predetermined temperature threshold.

The load determination module 84 may then determine the load on the SCR catalyst 36. More specifically, the load determination module 84 may increase injection of the dosing agent into the exhaust gas (e.g., via dosing injector 40) until slip (e.g., $NH_3$) is detected downstream of the SCR catalyst 36. In other words, the NOx sensor 44 may be cross-sensitive to ammonia ($NH_3$) and thus may detect dosing agent as NOx downstream of the SCR catalyst 36. The load determination module 84 may then determine the load on the SCR catalyst 36 based on the amounts of dosing agent injected and detected (i.e., slip). For example, the load may include a difference between the amount of dosing agent injected (e.g., via dosing injector 40) when the slip was detected and the amount of dosing agent detected downstream of the SCR catalyst 36 (e.g., at NOx sensor 44).

Figure 4B:
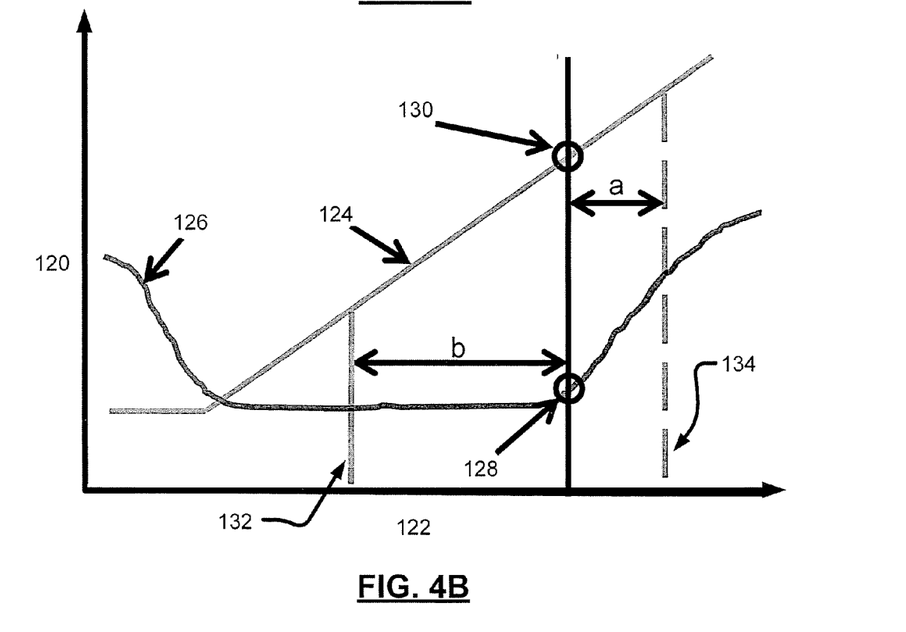
FIG. 4B is a graph illustrating an exemplary method for determining load on an SCR catalyst.

FIG. 4B illustrates SCR load and downstream NOx sensor measurements during an exemplary determination of the load on an SCR catalyst. For example, the illustrated determination may occur during the new temperature set point (see FIG. 4A and above). A vertical axis 120 indicates EGR (e.g., in °

C.) and a horizontal axis 122 indicates time. Curves 124 and 126 represent accumulated load on the SCR catalyst 36 and measured downstream NOx (e.g., measured NH3 using the NOx sensor 44), respectively.

As previously described, injection of the dosing agent may be increased (e.g., at an injection rate α>1) until slip is detected at 128 using the downstream NOx sensor 44. When the slip Is detected at 128, the load on the SCR catalyst 36 may be detected at 130. A first period (b) indicates a period between a full SCR load at 132 and the detection of slip at 128. A second period ("a") indicates a period between the detection of slip at 128 and the determined load 134 on the SCR catalyst.

Referring again to FIG. 3, the age determination module 88 communicates with the load determination module 84. For example, the age determination module 88 may receive the determined load on the SCR catalyst 36 from the load determination module 84. The age determination module 88 may determine an age of the SCR catalyst 36 based on the determined load of the SCR catalyst 36. More specifically, the age determination module 88 may determine the age of the SCR catalyst 36 based on the determined load and a plurality of predetermined relationships between load and EGT. For example, the plurality of predetermined relationships may include first and second relationships corresponding to a new SCR catalyst and an aged (e.g., 50% life) SCR catalyst, respectively.

Referring again to FIG. 4B, the aging factor may be determined based on the first and second periods b and a, respectively. More specifically, the aging factor may be determined as follows:

$$\text{Aging Factor} = b/(a+b), \tag{1}$$

In other words, the aging factor may be approximately one (i.e., no aging) when the second period a is relatively short compared to the first period b.

Referring again to FIG. 3, the SCR control module 92 communicates with the age determination module 88. For example, the SCR control module 92 may receive the determined age and/or aging factor of the SCR catalyst 36 from the age determination module 88. The SCR control module 92 may control operation of the SCR catalyst 36. More specifically, the SCR control module 92 may control injection of the dosing agent into the exhaust gas to improve performance of the SCR catalyst 36 (e.g., decrease emissions such as due to HC slip). For example, the SCR control module 92 may generate a control signal that controls the dosing injector 40.

Figure 5:
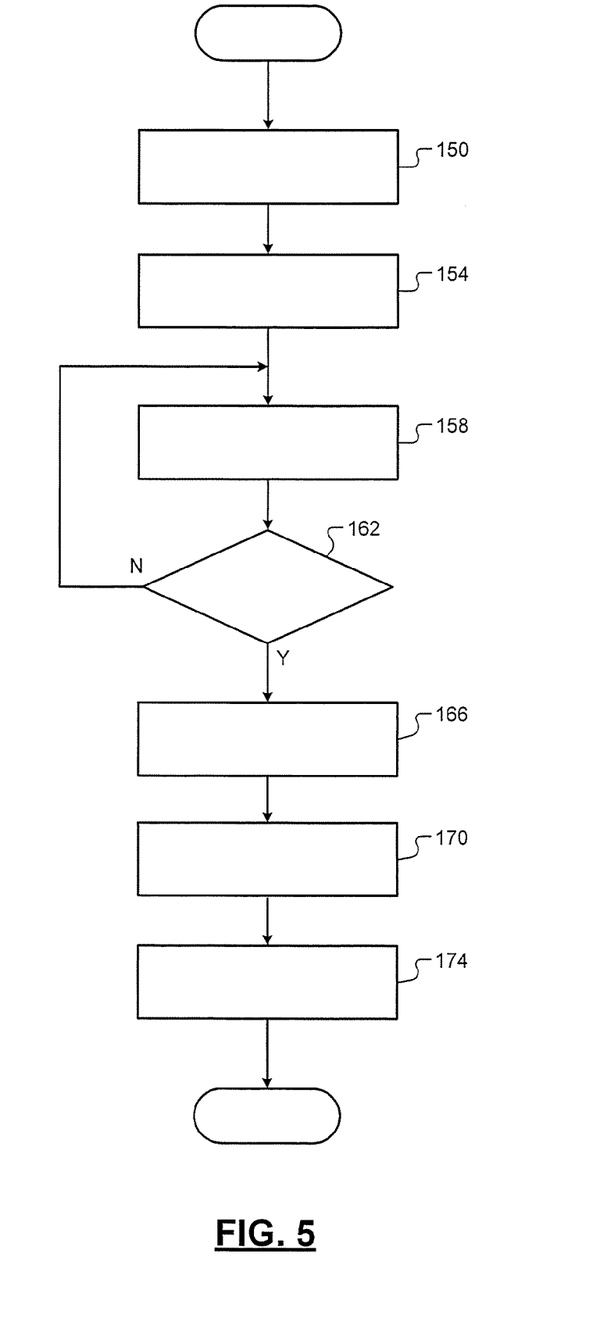
FIG. 5 is a flow diagram of an exemplary method for determining an age of and controlling an SCR catalyst according to the present disclosure.

Referring now to FIG. 5, a method for determining the age of the SCR catalyst 36 and controlling the SCR catalyst 36 begins at 150. At 150, the control module 60 decreases the load on the SCR catalyst 36 below the predetermined load threshold. For example, the control module 60 may passively decrease the load by waiting for a regeneration cycle of the PM filter 38. Alternatively, for example, the control module 60 may actively decrease the load by increasing EGT above a predetermined temperature threshold via post-combustion fuel injection (e.g., fuel injectors 22) and/or auxiliary HC injection (e.g., auxiliary injector 32).

At 154, the control module 60 may increase the EGT to a new temperature set point that has known loads for both new and aged (e.g., 50% life) SCR catalysts. For example, the new temperature set point may be greater than the EGT from the passive/active control at 150. At 158, the control module 60 may increase injection of the dosing agent (e.g., via dosing injector 40). At 162, the control module 60 determines whether slip is detected (e.g., dosing agent at the downstream NOx sensor 44).

At 166, the control module 60 may determine a load on the SCR catalyst 36. For example, the control module 60 may determine the load on the SCR catalyst 36 based on a difference between the amount of dosing agent injected and the amount of dosing agent (e.g., $NH_3$) detected downstream at NOx sensor 44. At 170, the control module 60 may determine an age and/or an aging factor of the SCR catalyst based on the determined load and a plurality of predetermined relationships between load and EGT (e.g., new and aged SCR catalysts).

At 174, the control module 60 may control the SCR catalyst based on the aging factor (AF). For example, the control module 60 may increase injection of the dosing agent (DA) based on the aging factor (e.g., $DA_{CORR}=DA_{DES} \times AF$). Additionally or alternatively, the control module 60 may determine whether the SCR catalyst 36 has failed. For example, the control module 60 may determine that the SCR catalyst 36 has failed when the age is greater than a predetermined age threshold. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust treatment system for exhaust gas produced by an engine, the exhaust treatment system comprising:
a first electronic circuit configured to decrease a load on a selective catalytic reduction (SCR) catalyst below a predetermined load threshold, and to increase exhaust gas temperature (EGT) to a predetermined temperature;
a second electronic circuit configured to increase injection of a dosing agent into the exhaust gas and to determine a load on the SCR catalyst when dosing agent is detected downstream from the SCR catalyst; and
a third electronic circuit configured to determine an age of the SCR catalyst based on the determined load and first and second predetermined loads corresponding to first and second ages of the SCR catalyst, respectively, wherein the first and second ages of the SCR catalyst are different.

2. The exhaust treatment system of claim 1, wherein the first electronic circuit is configured to decrease the load on the SCR catalyst below the predetermined load threshold by injecting hydrocarbons (HC) into the exhaust gas until EGT reaches the predetermined temperature.

3. The exhaust treatment system of claim 1, wherein the first electronic circuit is further configured to passively decrease the load on the SCR catalyst below the predetermined load threshold by waiting for a regeneration operation of a particulate matter (PM) filter.

4. The exhaust treatment system of claim 3, wherein the first electronic circuit is further configured to introduce a new temperature set point at an end of the regeneration operation, wherein the new temperature set point includes the predetermined temperature, and wherein the predetermined temperature is greater than EGT during the regeneration operation.

5. The exhaust treatment system of claim 1, wherein the second electronic circuit is configured to determine the load on the SCR catalyst based on a difference between an amount of dosing agent injected and an amount of dosing agent detected downstream from the SCR catalyst.

6. The exhaust treatment system of claim 1, wherein the first predetermined load corresponds to a new SCR catalyst having a full-life and the second predetermined load corresponds to an aged SCR catalyst having a half-life.

7. The exhaust treatment system of claim 1, wherein the third electronic circuit is further configured to measure first and second periods, wherein the first period includes a period from increasing injection of the dosing agent until the dosing agent is detected downstream from the SCR catalyst, and wherein the second period includes a period from when the dosing agent is detected downstream from the SCR catalyst until the load on the SCR catalyst is determined.

8. The exhaust treatment system of claim 7, wherein the third electronic circuit is further configured to determine an aging factor by dividing the first period by a sum of the first period and the second period.

9. The exhaust treatment system of claim 8, further comprising:
a fourth electronic circuit configured to control injection of a corrected amount of the dosing agent, wherein the corrected amount of the dosing agent includes a product of a desired amount of dosing agent and the aging factor.

10. The exhaust treatment system of claim 1, wherein the dosing agent is detected downstream of the SCR catalyst by a NOx sensor that measures NOx levels in the exhaust gas and that is cross-sensitive to at least one component of the dosing agent.

11. A method, comprising:
decreasing a load on a selective catalytic reduction (SCR) catalyst below a predetermined load threshold;
increasing exhaust gas temperature (EGT) to a predetermined temperature;
increasing injection of a dosing agent into exhaust gas produced by an engine;
determining a load on the SCR catalyst when dosing agent is detected downstream from the SCR catalyst; and
determining an age of the SCR catalyst based on the determined load and first and second predetermined loads corresponding to first and second ages of the SCR catalyst, respectively, wherein the first and second ages of the SCR catalyst are different.

12. The method of claim 11, wherein the load on the SCR catalyst is actively decreased below the predetermined load threshold by injecting hydrocarbons (HC) into the exhaust gas until EGT reaches the predetermined temperature.

13. The method of claim 11, wherein the load on the SCR catalyst is passively decreased below the predetermined load threshold by waiting for a regeneration operation of a particulate matter (PM) filter.

14. The method of claim 13, further comprising introducing a new temperature set point at an end of the regeneration operation, wherein the new temperature set point includes the predetermined temperature, and wherein the predetermined temperature is greater than EGT during the regeneration operation.

15. The method of claim 11, wherein the load on the SCR catalyst is determined based on a difference between an amount of dosing agent injected and an amount of dosing agent detected downstream from the SCR catalyst.

16. The method of claim 11, wherein the first predetermined load corresponds to a new SCR catalyst having a full-life and the second predetermined load corresponds to an aged SCR catalyst having a half-life.

17. The method of claim 11, further comprising measuring first and second periods, wherein the first period includes a period from increasing injection of the dosing agent until the dosing agent is detected downstream from the SCR catalyst, and wherein the second period includes a period from when the dosing agent is detected downstream from the SCR catalyst until the load on the SCR catalyst is determined.

18. The method of claim 17, further comprising determining an aging factor by dividing the first period by a sum of the first period and the second period.

19. The method of claim 18, further comprising controlling injection of a corrected amount of the dosing agent, wherein the corrected amount of the dosing agent includes a product of a desired amount of dosing agent and the aging factor.

20. The method of claim 11, further comprising detecting the dosing agent downstream of the SCR catalyst using a NOx sensor that measures NOx levels in the exhaust gas and that is cross-sensitive to at least one component of the dosing agent.

* * * * *